(12) United States Patent
Goto et al.

(10) Patent No.: US 10,391,643 B2
(45) Date of Patent: Aug. 27, 2019

(54) ROBOT

(71) Applicant: Seiko Epson Corporation, Tokyo (JP)

(72) Inventors: Yoshinobu Goto, Azumino (JP);
Kazuto Yoshimura, Matsumoto (JP)

(73) Assignee: Seiko Epson Corporation (JP)

( * ) Notice: Subject to any disclaimer, the term of this patent is extended or adjusted under 35 U.S.C. 154(b) by 545 days.

(21) Appl. No.: 15/133,388

(22) Filed: Apr. 20, 2016

(65) Prior Publication Data

US 2016/0311120 A1 Oct. 27, 2016

(30) Foreign Application Priority Data

Apr. 27, 2015 (JP) .................................. 2015-090067

(51) Int. Cl.
*B25J 19/00* (2006.01)
*H02G 11/02* (2006.01)

(52) U.S. Cl.
CPC .......... *B25J 19/0029* (2013.01); *H02G 11/02* (2013.01)

(58) Field of Classification Search
CPC .............................. B25J 19/0029; H02G 11/02
See application file for complete search history.

(56) References Cited

U.S. PATENT DOCUMENTS

| | | | | |
|---|---|---|---|---|
| 3,300,572 A | * | 1/1967 | Dahlgren | H01B 7/06 174/69 |
| 4,808,773 A | * | 2/1989 | Crandall | H01B 11/12 174/113 R |
| 5,057,646 A | * | 10/1991 | Nichols | H01B 7/0823 174/115 |
| 5,226,831 A | * | 7/1993 | Horiuchi | H01R 35/025 439/15 |
| 5,980,287 A | * | 11/1999 | Sasaki | H01R 35/025 439/15 |
| 7,038,139 B2 | * | 5/2006 | Kanayama | B60R 16/027 174/117 F |
| 8,414,303 B2 | | 4/2013 | Nakamura et al. | |
| 8,858,236 B2 | * | 10/2014 | Richard | H01R 39/64 439/21 |
| 9,845,785 B2 | * | 12/2017 | Vigars | F03B 13/264 |
| 2002/0019150 A1 | * | 2/2002 | Kuki | B60R 16/027 439/11 |
| 2003/0221504 A1 | | 12/2003 | Stoianovici et al. | |
| 2010/0313694 A1 | * | 12/2010 | Aoki | B25J 19/0029 74/490.02 |

FOREIGN PATENT DOCUMENTS

| | | |
|---|---|---|
| JP | 2004-222436 A | 8/2004 |
| JP | 2010-214530 A | 9/2010 |
| JP | 2010-240828 A | 10/2010 |
| JP | 2013-039671 A | 2/2013 |

* cited by examiner

*Primary Examiner* — David M Fenstermacher
(74) *Attorney, Agent, or Firm* — Harness, Dickey & Pierce, P.L.C.

(57) ABSTRACT

A robot includes an nth arm, an (n+1)th arm rotatably provided on the nth arm, and a core member provided at a center of rotation of the (n+1)th arm and having a first member and a second member. In the robot, a flat cable is sandwiched by the first member and the second member and wound around the core member.

10 Claims, 15 Drawing Sheets

ROBOT

BACKGROUND

1. Technical Field

The present invention relates to a robot.

2. Related Art

In related art, robots with robot arms are known. In the robot arm, a plurality of arms are coupled via joint parts and, as an end effector, e.g. a hand is attached to the arm on the most distal end side (on the most downstream side). The joint parts are driven by motors and the arms rotate by the driving of the joint parts. Then, for example, the robot grasps an object with the hand, moves the object to a predetermined location, and performs predetermined work such as assembly.

A cable for power supply to the motor passes through the joint part. The cable is pulled and twisted at each time when the joint part is driven and mechanically loaded, and it is necessary to suppress the load as much as possible. As measures therefor, e.g. a configuration in which the cable is wound around a core member within the joint part as described in Patent Document 1 (JP-A-2004-222436) is considered.

However, by simply winding the cable around the core member, a problem that the winding state is not maintained as the robot is continuously used, the mechanical load is not completely suppressed, and finally, the cable is fractured occurs.

SUMMARY

At least a part of the problems described above can be solved by the following application examples of the invention.

Application Example 1

A robot according to this application example of the invention includes a core member having a first member and a second member, wherein a flat cable is sandwiched by the first member and the second member and wound around the core member.

With this configuration, the mechanical load on the flat cable may be suppressed.

Application Example 2

In the robot according to the application example of the invention, it is preferable that an nth arm, and an (n+1)th arm rotatably provided on the nth arm are provided, wherein the flat cable is fixed to the nth arm and the (n+1)th arm.

With this configuration, both end sides of the flat cable may be respectively fixed and the mechanical load on the flat cable during operation of the robot may be suppressed.

Application Example 3

In the robot according to the application example of the invention, it is preferable that the core member is placed at a center of rotation of the (n+1)th arm.

With this configuration, when the (n+1)th arm rotates about the center of rotation during operation of the robot, the mechanical load on the flat cable may be suppressed.

Application Example 4

In the robot according to the application example of the invention, it is preferable that a first guide portion provided in the core member and regulating the flat cable to be wound around an outer circumference of the core member is provided.

With this configuration, the winding state of the flat cable around the core member may be stabilized, and the mechanical load on the flat cable during operation of the robot may be suppressed.

Application Example 5

In the robot according to the application example of the invention, it is preferable that an external cylinder member that places the core member inside is provided.

With this configuration, the flat cable may be protected between the external cylinder member and the core member.

Application Example 6

In the robot according to the application example of the invention, it is preferable that a housing portion located between the core member and the external cylinder member and housing the flat cable, a first fixing portion that fixes the flat cable to the core member, and a second guide portion located between the housing portion and the first fixing portion and regulating a width direction of the flat cable are provided, wherein a length in the width direction regulated by the second guide portion is shorter than a length in the width direction regulated by the housing portion.

With this configuration, the regulation on the flat cable may be gradually relaxed from the core member side toward the housing portion side, and an excessive force on the flat cable within the housing portion may be suppressed.

Application Example 7

In the robot according to the application example of the invention, it is preferable that a second fixing portion that fixes the flat cable to the external cylinder member, and a third guide portion located between the housing portion and the second fixing portion and regulating the width direction of the flat cable are provided, wherein a length in the width direction regulated by the third guide portion is shorter than the length in the width direction regulated by the housing portion.

With this configuration, the regulation on the flat cable may be gradually relaxed from the second fixing portion side toward the housing portion side, and an excessive force on the flat cable within the housing portion may be suppressed.

Application Example 8

In the robot according to the application example of the invention, it is preferable that a guide roller provided in the housing portion, being in contact with the flat cable, and being rotatable is provided, wherein, of spaces formed by the housing portion, a space inner than a rotation axis of the guide roller is symmetric in the width direction.

With this configuration, even when the flat cable moves within the space inner than the rotation axis of the guide roller, the cable may be in contact with the members defining the space nearly equally, and thereby, local wear in the flat cable may be suppressed.

Application Example 9

In the robot according to the application example of the invention, it is preferable that a plurality of the guide rollers, and a supporting member that rotatably supports the plurality of guide rollers are provided.

With this configuration, when the core member rotates during the operation of the robot, the flat cable may smoothly move with the guide rollers and the supporting member within the housing portion, and the mechanical load on the flat cable may be suppressed.

Application Example 10

In the robot according to the application example of the invention, it is preferable that the respective guide rollers and the supporting member are rotatable independently of each other.

With this configuration, when the core member rotates during the operation of the robot, the flat cable may smoothly move with the guide rollers and the supporting member within the housing portion, and the mechanical load on the flat cable may be further suppressed.

Application Example 11

In the robot according to the application example of the invention, it is preferable that the flat cable is folded by one guide roller of the plurality of guide rollers.

With this configuration, when the core member rotates during the operation of the robot, the folded portion of the flat cable may smoothly move with the guide rollers and the supporting member within the housing portion, and the mechanical load on the flat cable may be suppressed.

Application Example 12

In the robot according to the application example of the invention, it is preferable that an nth arm provided rotatably about an nth rotation axis, and an (n+1)th arm provided rotatably about an (n+1)th rotation axis in a axis direction different from a axis direction of the nth rotation axis are provided, wherein a length of the nth arm is longer than a length of the (n+1) th arm, and the nth arm and the (n+1)th arm overlap as seen from the axis direction of the (n+1)th rotation axis.

With this configuration, when the distal end of the (n+1)th arm is moved to a position different by 180° about the nth rotation axis, the space for preventing interference of the robot may be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a robot according to the invention will be explained in detail based on preferred embodiments shown in the accompanying drawings.

First Embodiment

Figure 1:
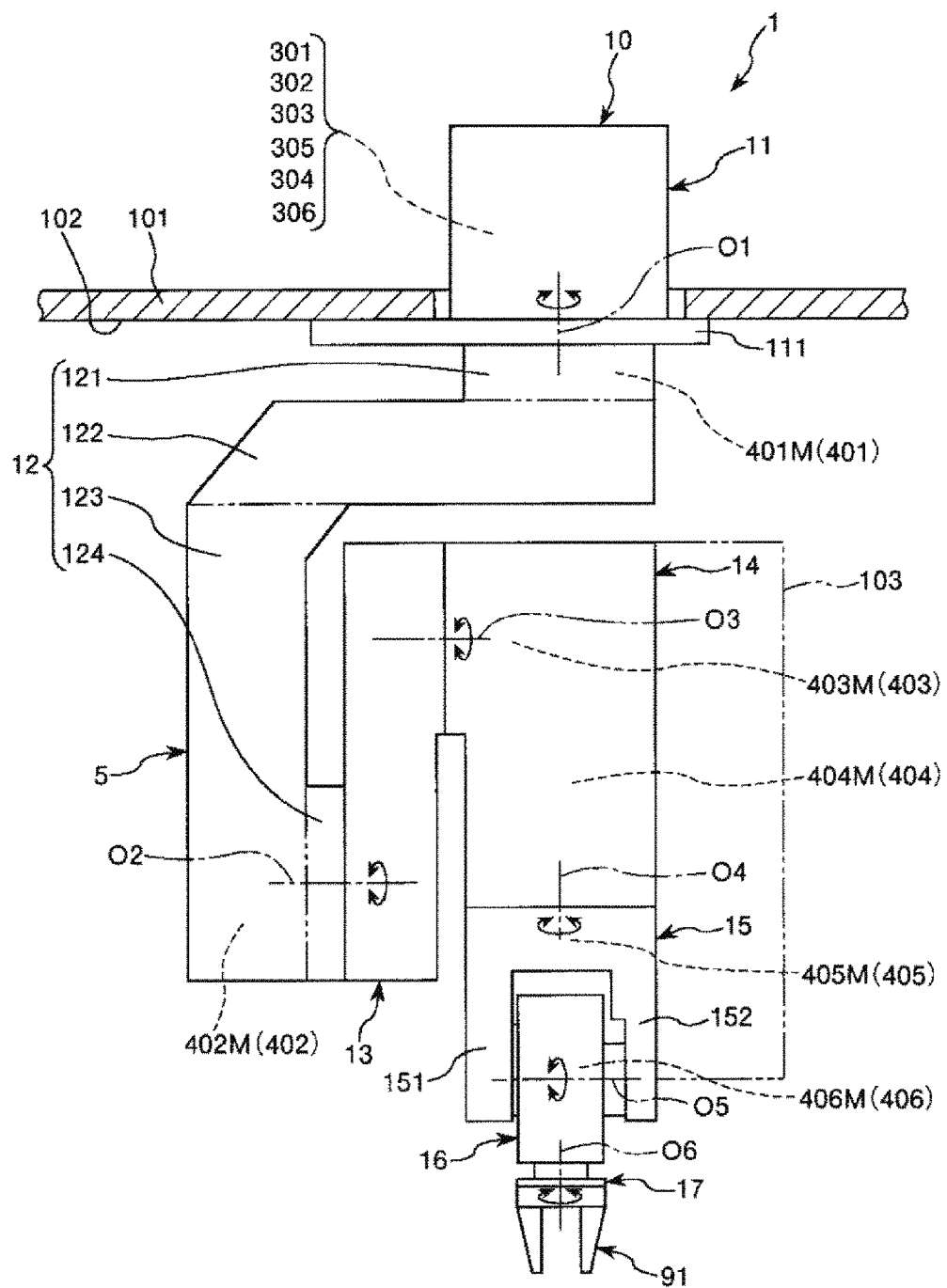
FIG. 1 is a front view showing the first embodiment of a robot according to the invention.
Figure 2:
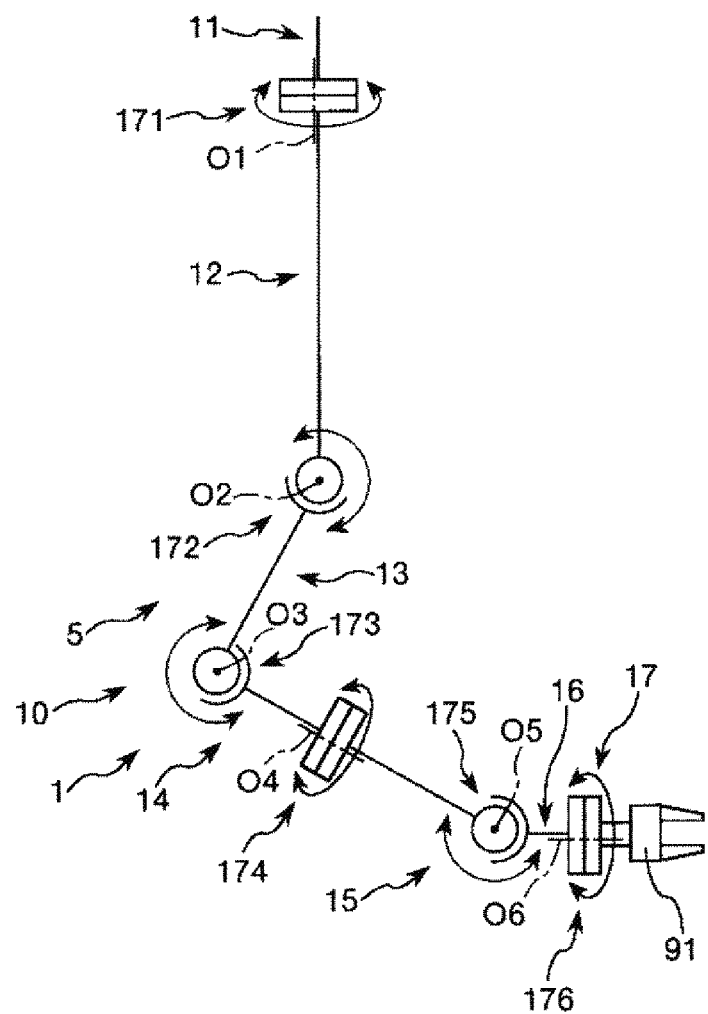
FIG. 2 is a schematic diagram of the robot shown in FIG. 1.
Figure 3:
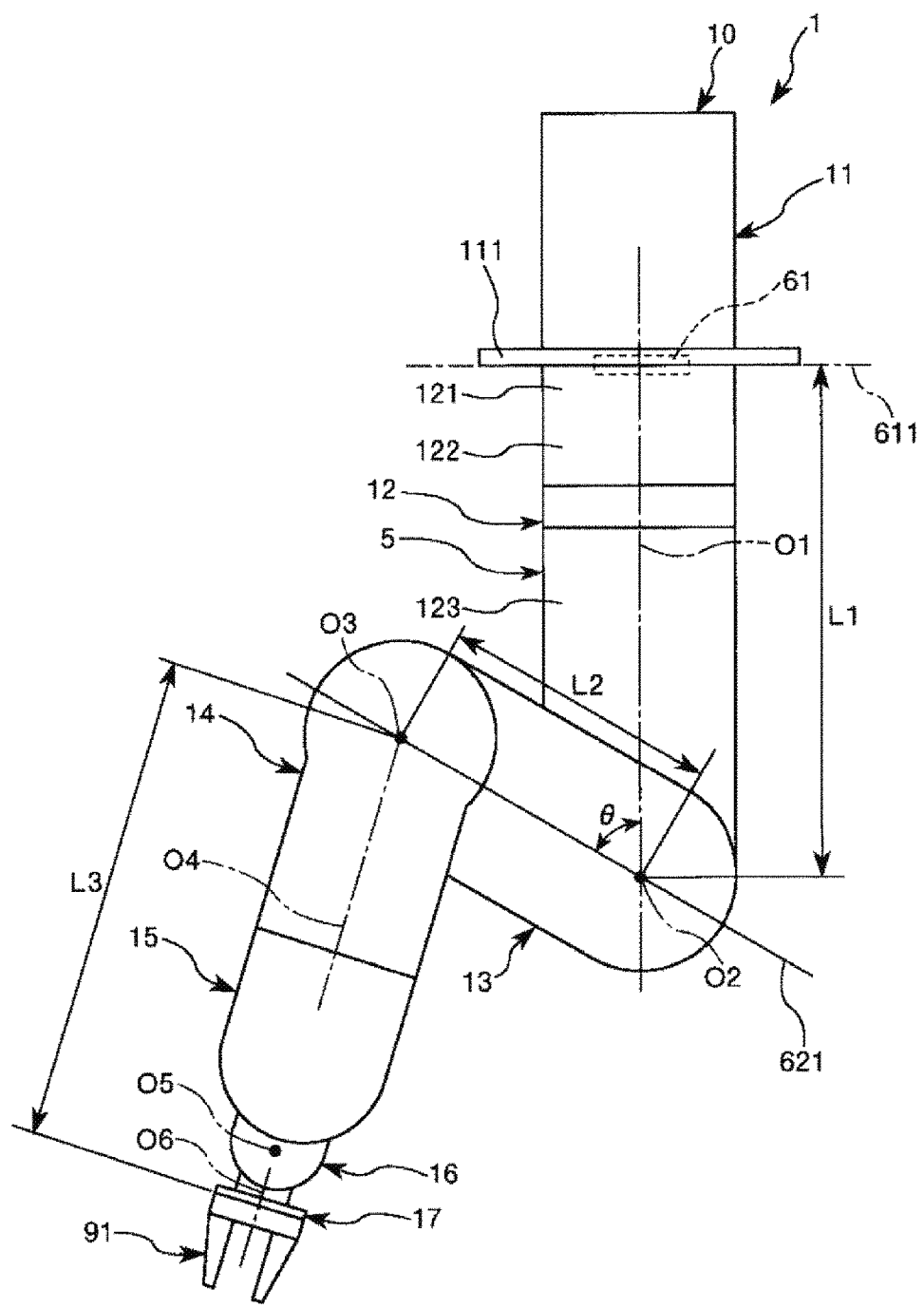
FIG. 3 is a side view of the robot shown in FIG. 1.
Figure 4:
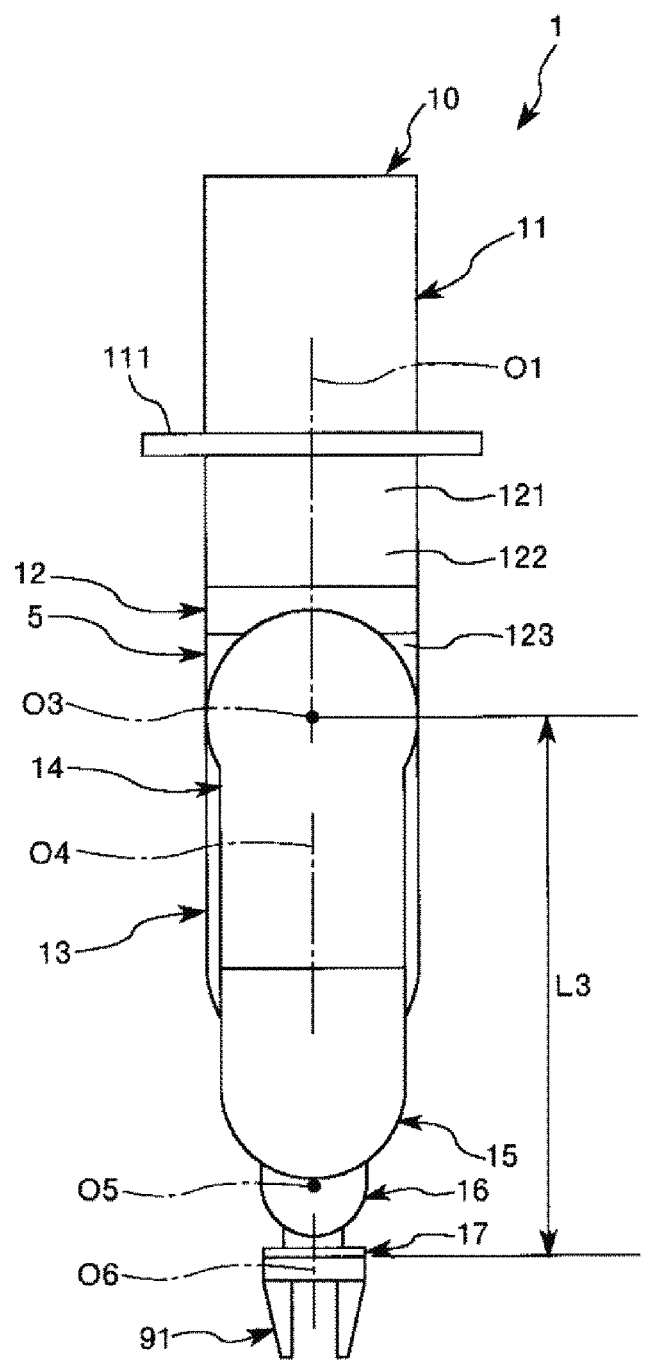
FIG. 4 is a side view of the robot shown in FIG. 1.
Figure 5:
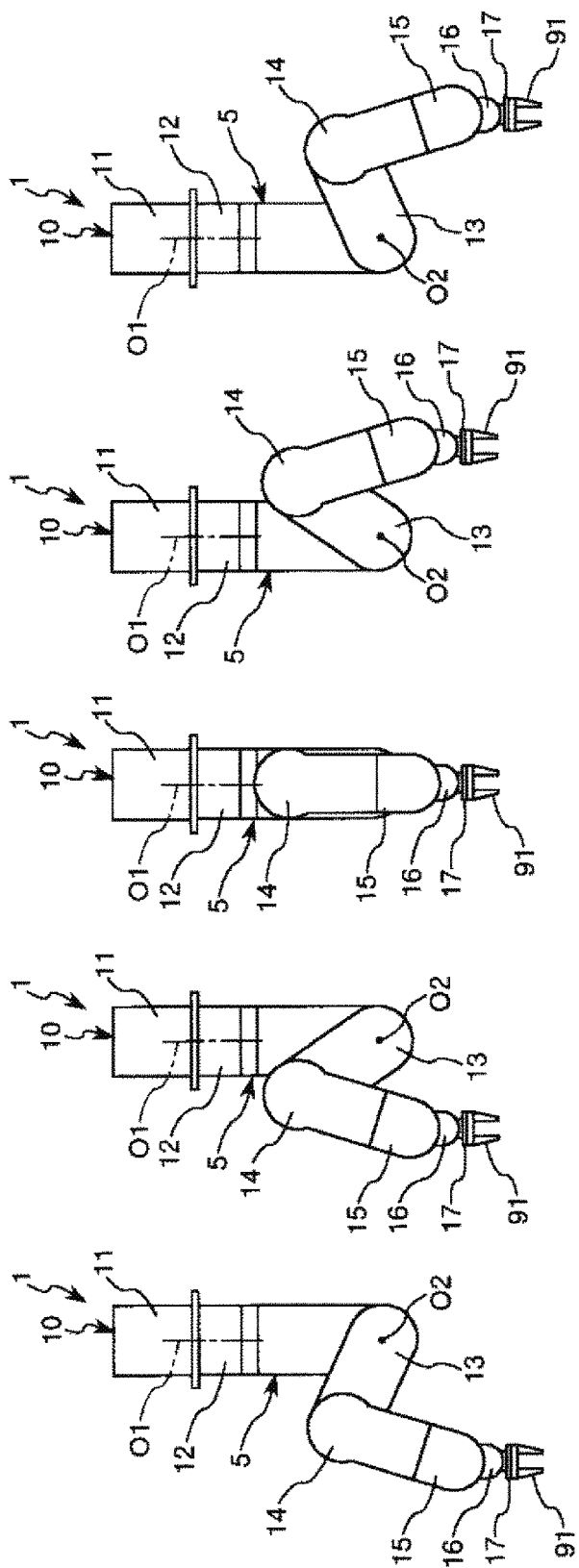
FIGS. 5A to 5E are diagrams for explanation of actions of the robot shown in FIG. 1.
Figure 6:
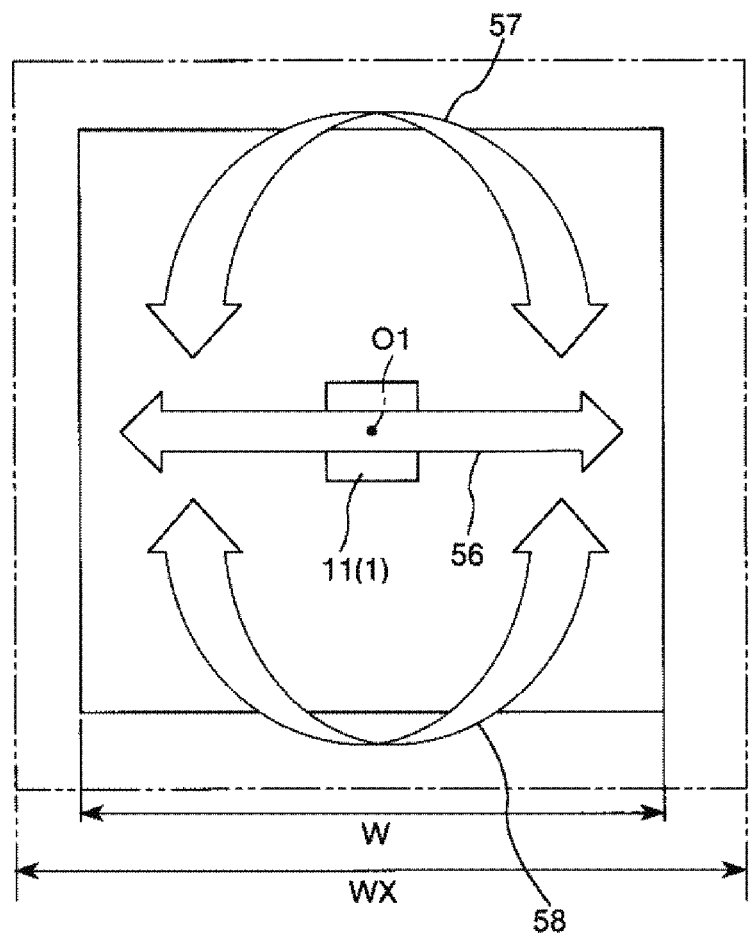
FIG. 6 is a diagram for explanation of movements of a distal end of a robot arm of the robot shown in FIG. 1.
Figure 7:
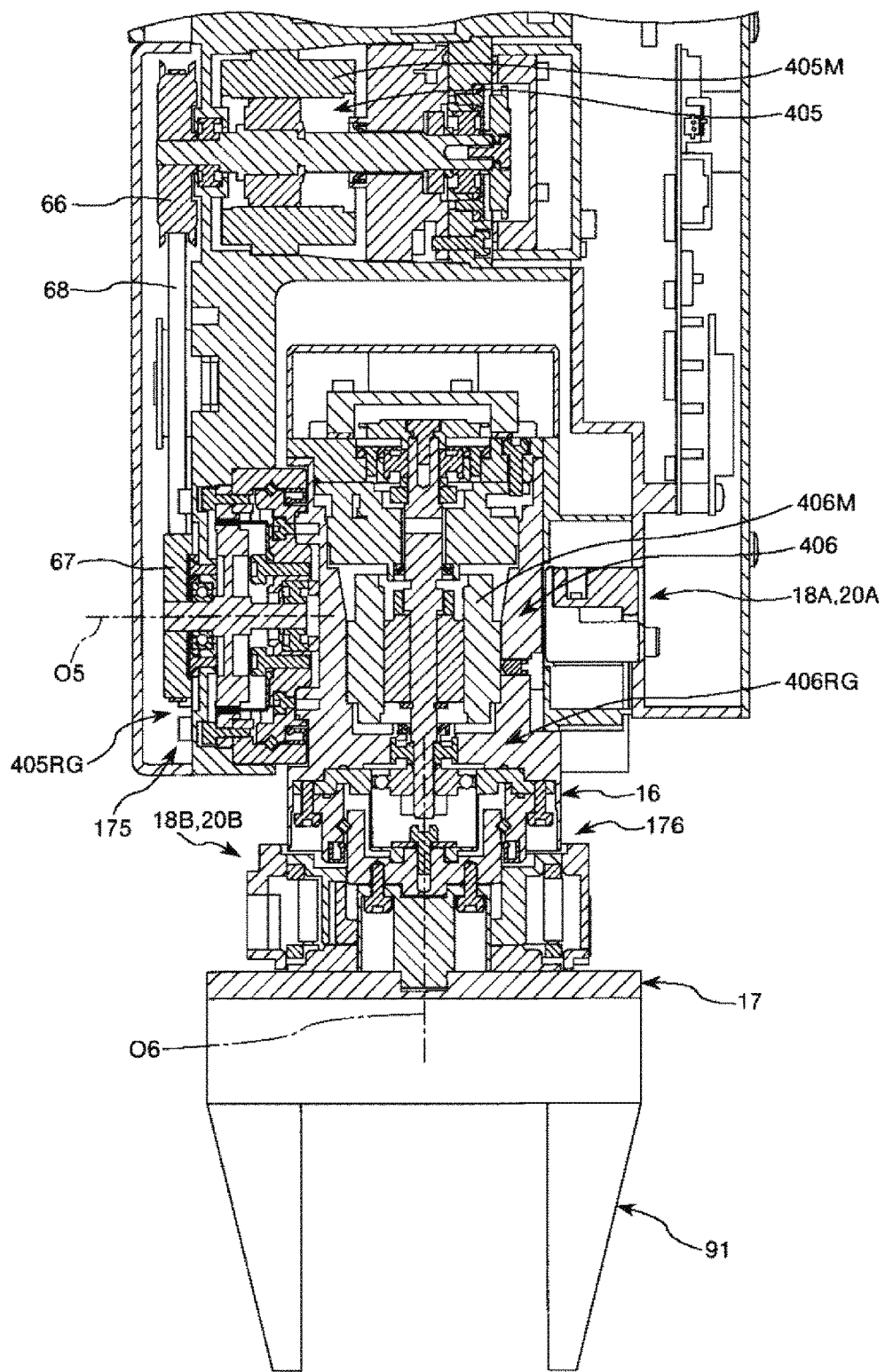
FIG. 7 is a sectional view of an internal structure of the distal end of the robot arm of the robot shown in FIG. 1.
Figure 8:
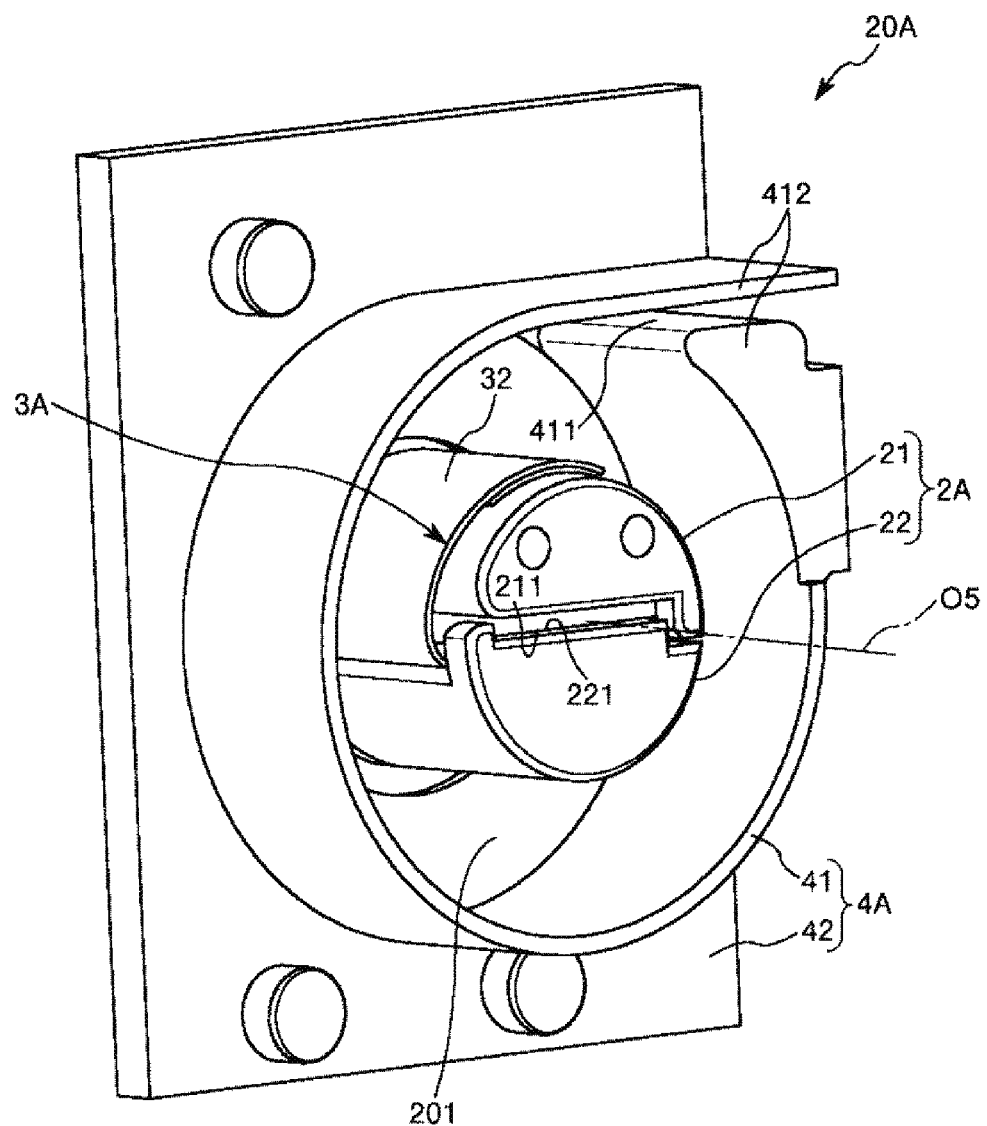
FIG. 8 is a perspective view of a flat cable holding unit of the robot shown in FIG. 1.
Figure 9:
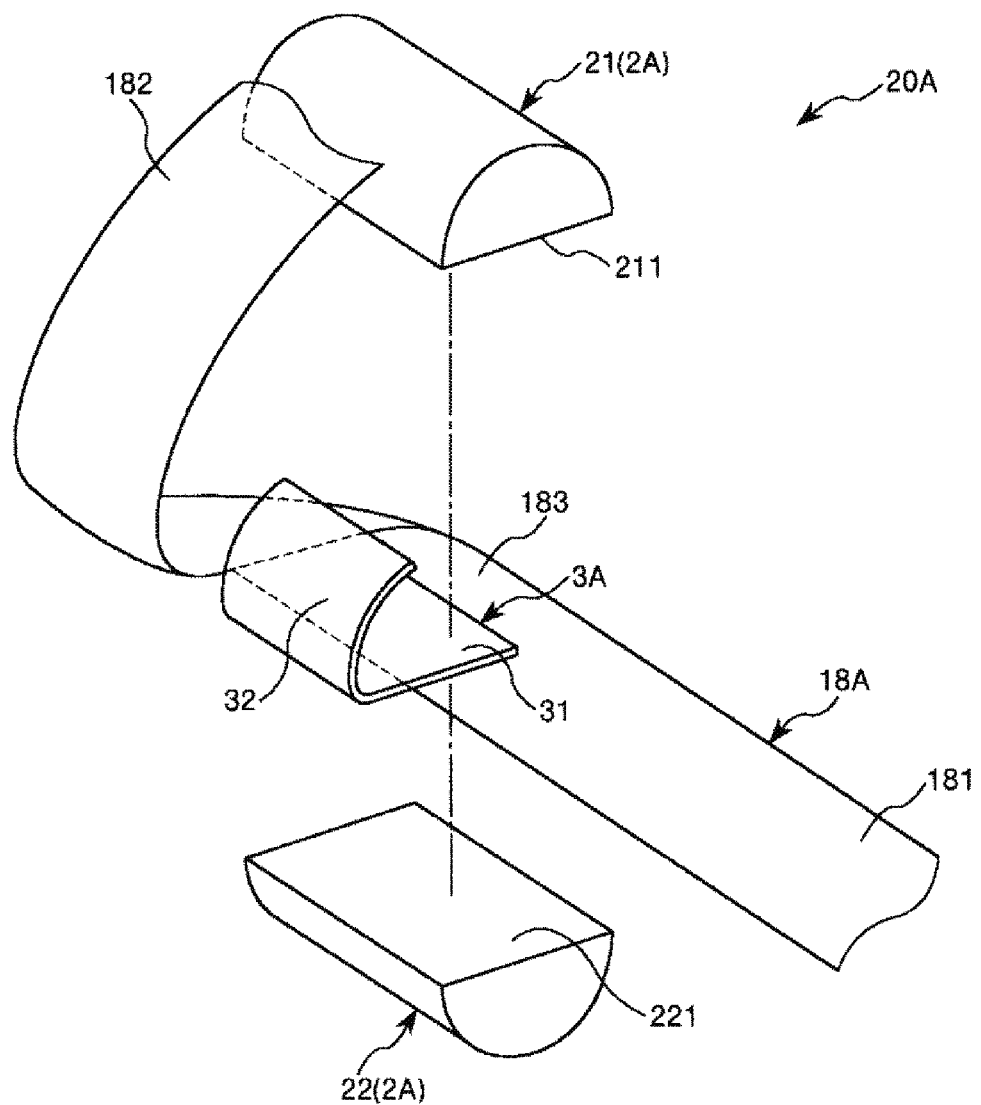
FIG. 9 is a schematic exploded perspective view showing a position relationship between the flat cable holding unit shown in FIG. 8 and a flat cable.
Figure 10:
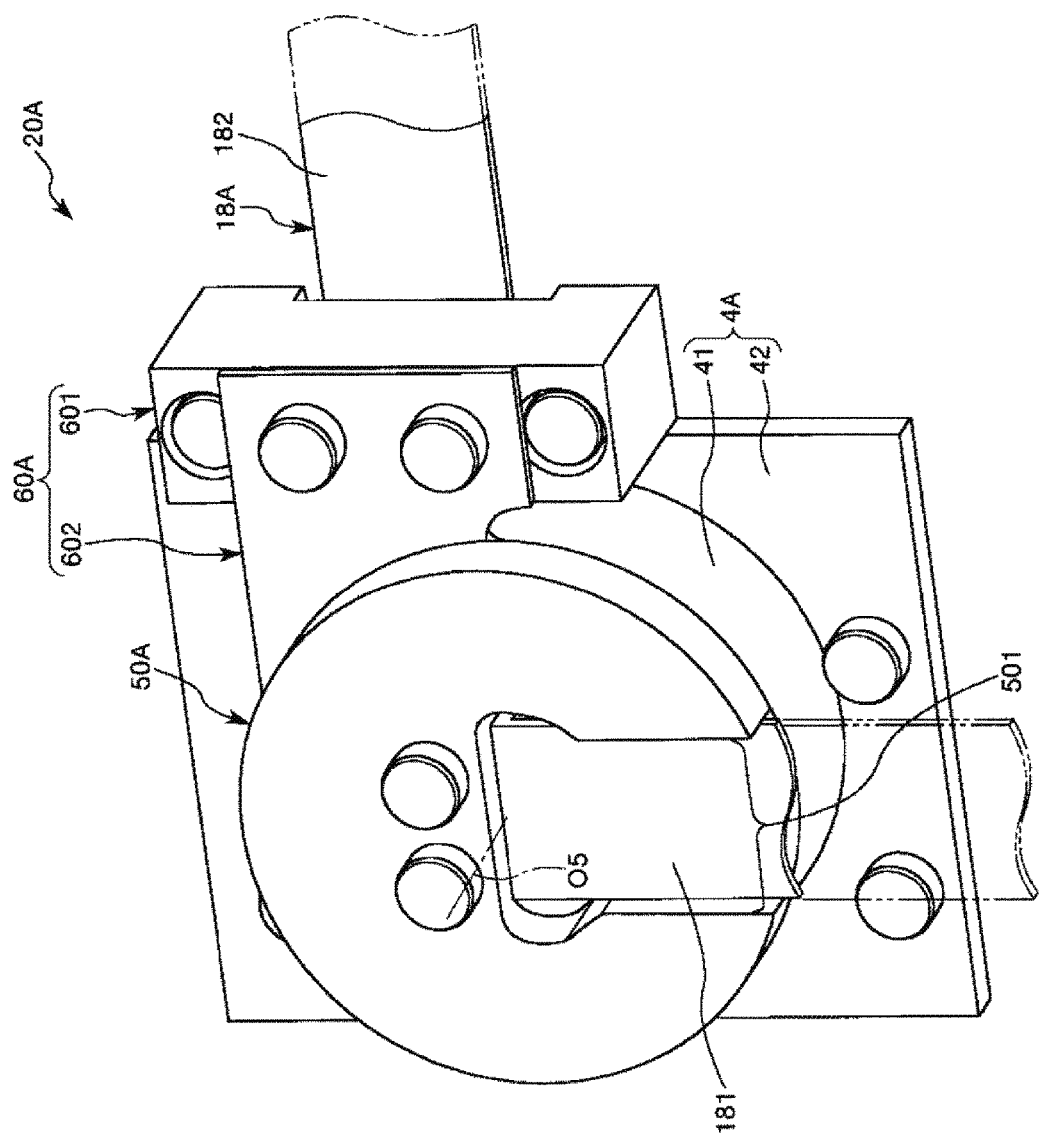
FIG. 10 is a perspective view showing a state in which the flat cable is held by the flat cable holding unit shown in FIG. 8.
Figure 11:
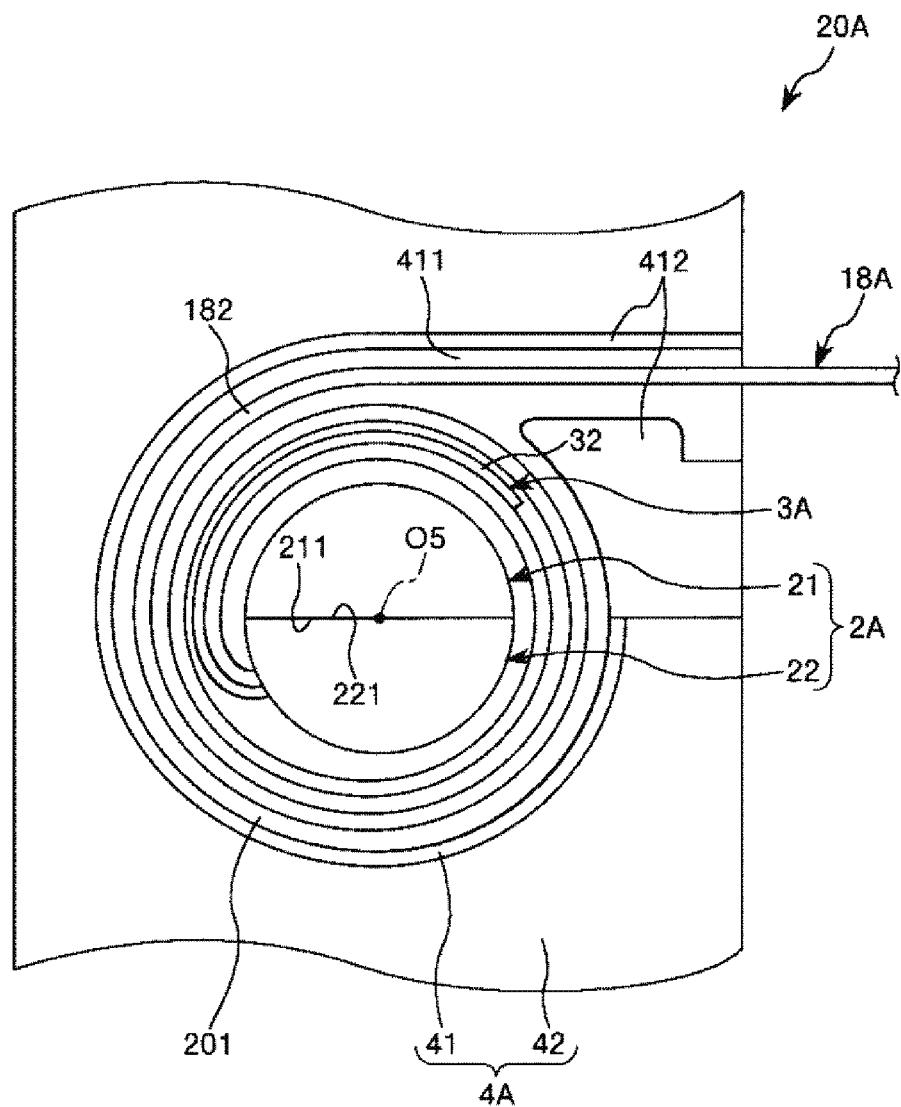
FIG. 11 is a schematic diagram showing a state of the internal structure in which the flat cable is held by the flat cable holding unit shown in FIG. 8.
Figure 12:
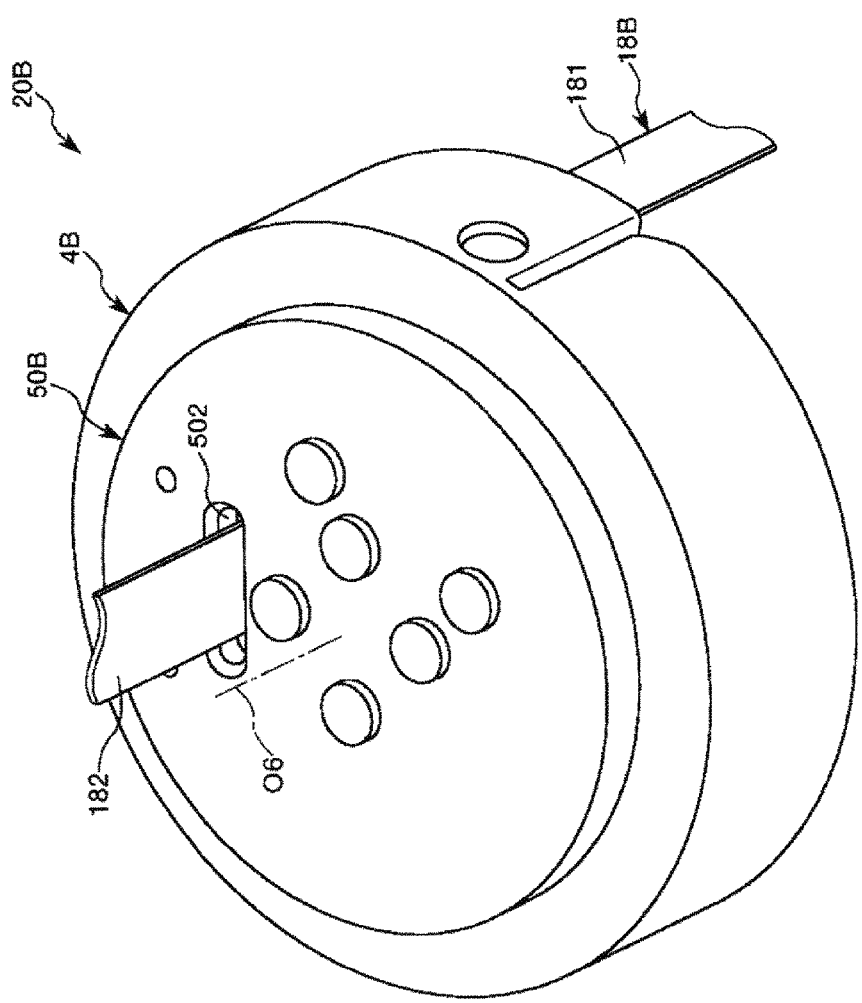
FIG. 12 is a perspective view showing a state in which the flat cable is held by a flat cable holding unit having another configuration than that of the flat cable holding unit shown in FIG. 8.
Figure 13:
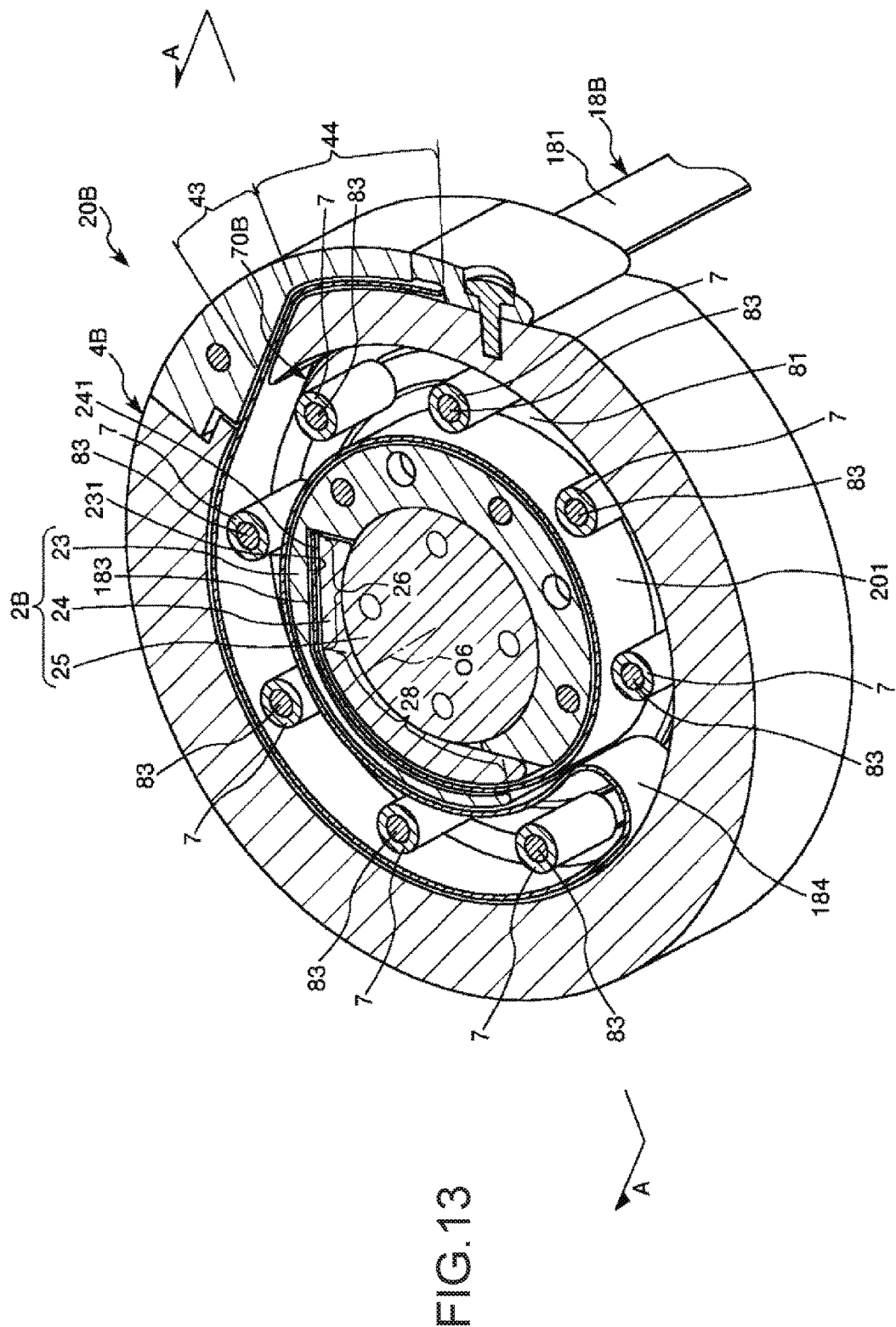
FIG. 13 is a cross-sectional view showing the state in which the flat cable is held by the flat cable holding unit shown in FIG. 12.
Figure 14:
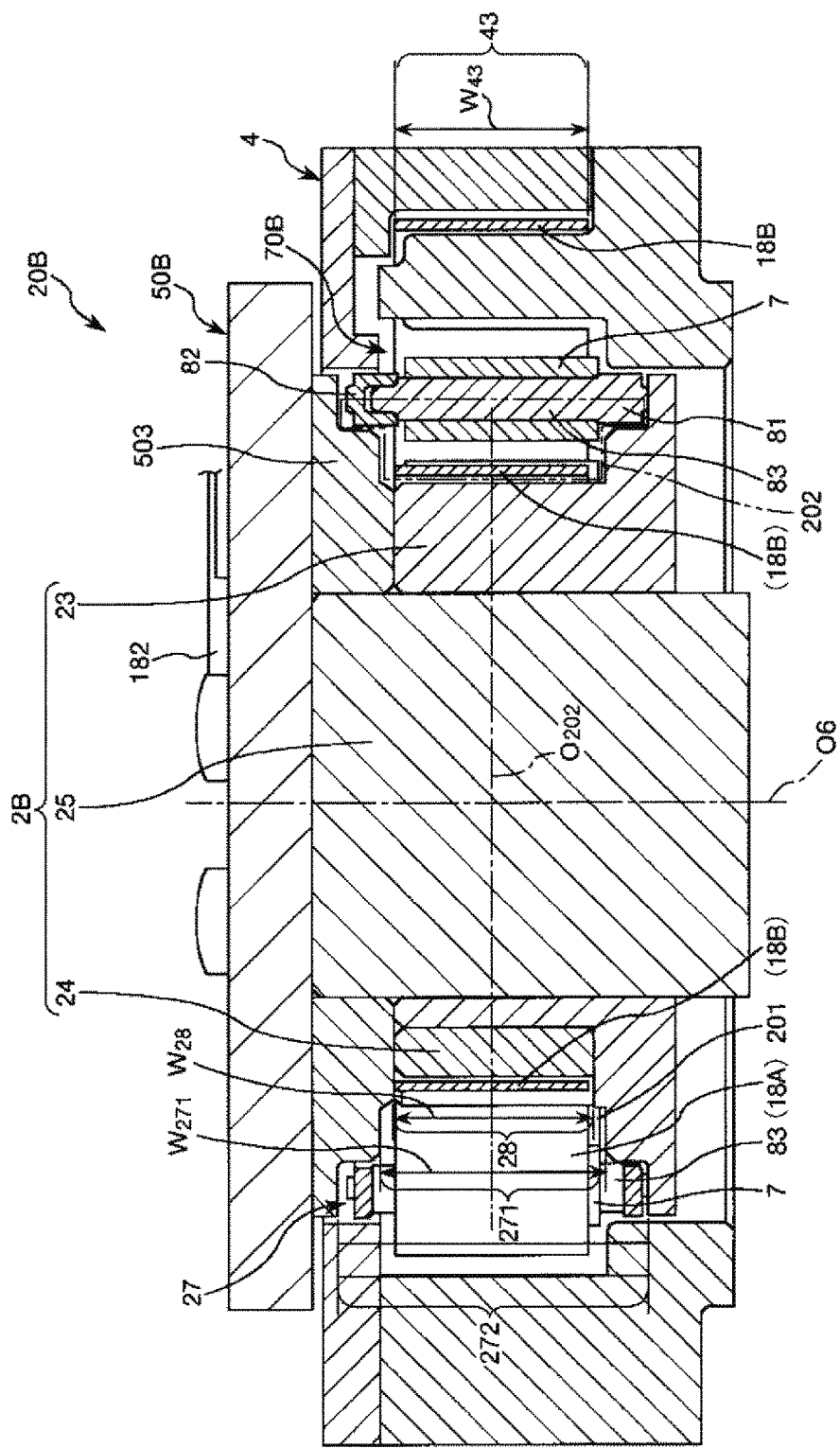
FIG. 14 is a sectional view along line A-A in FIG. 13.
Figure 15:
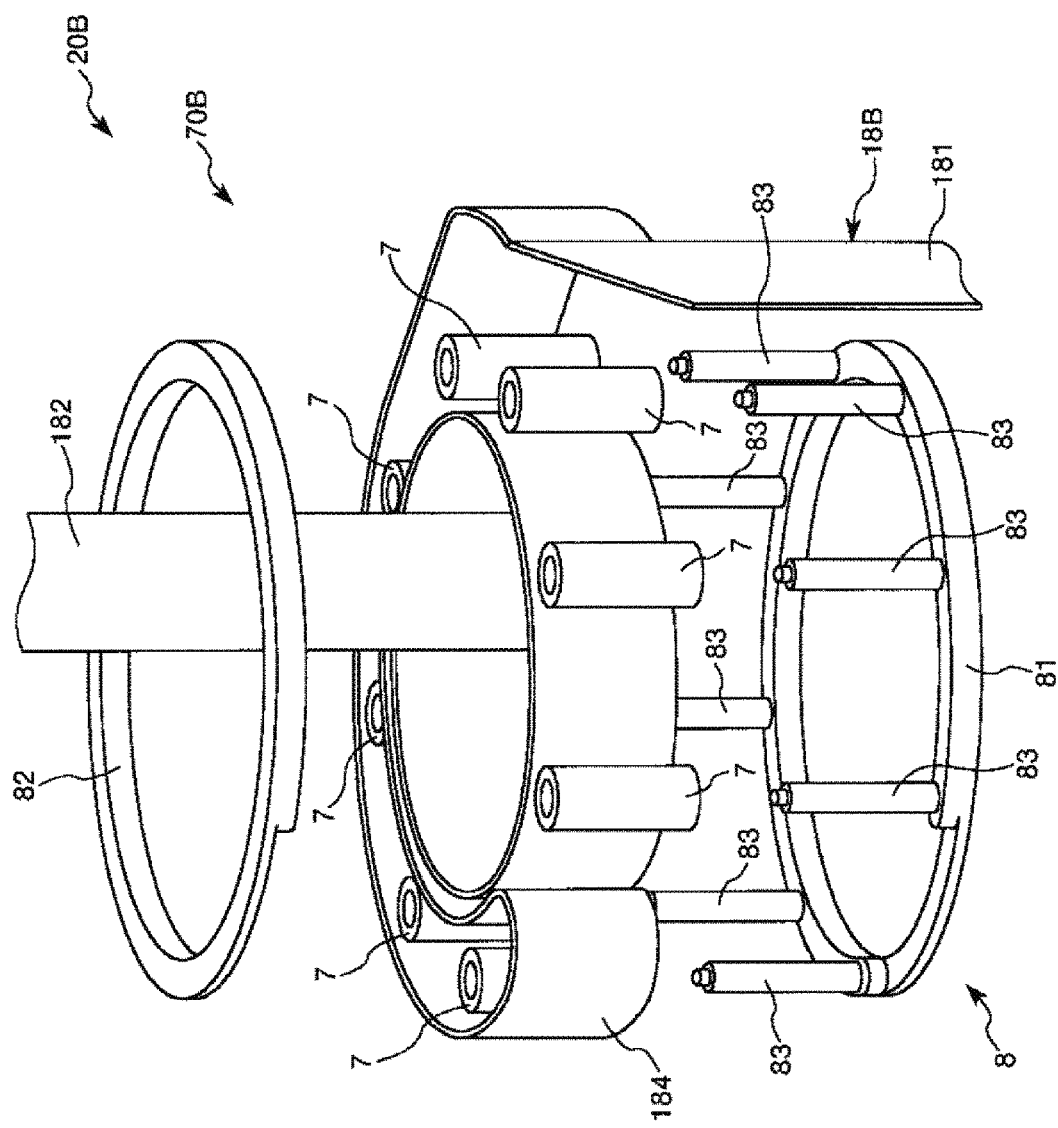
FIG. 15 is an exploded perspective view of the flat cable holding unit shown in FIG. 12.

FIG. 1 is a front view showing the first embodiment of a robot according to the invention. FIG. 2 is a schematic diagram of the robot shown in FIG. 1. FIGS. 3 and 4 are side views of the robot shown in FIG. 1. FIGS. 5A to 5E are diagrams for explanation of actions of the robot shown in FIG. 1. FIG. 6 is a diagram for explanation of movements of a distal end of a robot arm of the robot shown in FIG. 1. FIG. 7 is a sectional view of an internal structure of the distal end of the robot arm of the robot shown in FIG. 1. FIG. 8 is a perspective view of a flat cable holding unit of the robot shown in FIG. 1. FIG. 9 is a schematic exploded perspective view showing a position relationship between the flat cable holding unit shown in FIG. 8 and a flat cable. FIG. 10 is a perspective view showing a state in which the flat cable is held by the flat cable holding unit shown in FIG. 8. FIG. 11 is a schematic diagram showing a state of the internal structure in which the flat cable is held by the flat cable holding unit shown in FIG. 8. FIG. 12 is a perspective view showing a state in which the flat cable is held by a flat cable holding unit having another configuration than that of the flat cable holding unit shown in FIG. 8. FIG. 13 is a cross-sectional view showing the state in which the flat cable is held by the flat cable holding unit shown in FIG. 12. FIG. 14 is a sectional view along line A-A in FIG. 13. FIG. 15 is an exploded perspective view of the flat cable holding unit shown in FIG. 12.

Hereinafter, for convenience of explanation, the upside in FIGS. 1 to 5E and 7 is referred to as "up" or "upper" and the downside is referred to as "low" or "lower", the upward and downward directions are referred to as "vertical directions" and the leftward and rightward directions are referred to as "horizontal directions". Further, the base side in FIGS. 1 to 5E and 7 is referred to as "proximal end" or "upstream" and the opposite side (the hand side) is referred to as "distal end" or "downstream".

A robot (industrial robot) 1 shown in FIG. 1 includes a robot main body (main body unit) 10 and a robot control apparatus (control unit) (not shown) that controls operation of the robot main body 10 (robot 1). For example, the robot 1 may be used in a manufacturing process of manufacturing precision apparatuses such as wristwatches or the like. The robot 1 may perform work of feeding, removing, carrying, and assembly of the precision apparatuses and parts forming the apparatuses. The robot control apparatus may be provided inside of the robot main body 10, or separated from the robot main body 10. Further, the robot control apparatus may be formed using e.g. a personal computer (PC) containing a CPU (Central Processing Unit) or the like.

The robot main body 10 includes a base (supporting part) 11 and a robot arm 5. The robot arm 5 includes a first arm (nth arm) 12, a second arm ((n+1)th arm) 13, a third arm 14, a fourth arm 15, a fifth arm 16, and a sixth arm 17 (six arms), and a first drive source 401, a second drive source 402, a third drive source 403, a fourth drive source 404, a fifth drive source 405, and a sixth drive source 406 (six drive sources). For example, an end effector such as a hand 91 that grasps a precision apparatus such as a wristwatch, a part, or the like may be detachably attached to the distal end of the sixth arm 17.

The robot 1 having the robot main body 10 is a vertical articulated (six-axis) robot in which the base 11, the first arm 12, the second arm 13, the third arm 14, the fourth arm 15, the fifth arm 16, and the sixth arm 17 are sequentially coupled from the proximal end side toward the distal end side. As below, the first arm 12, the second arm 13, the third arm 14, the fourth arm 15, the fifth arm 16, and the sixth arm 17 will be respectively also referred to as "arm". The first drive source 401, the second drive source 402, the third drive source 403, the fourth drive source 404, the fifth drive source 405, and the sixth drive source 406 will be respectively also referred to as "drive source (drive unit)".

As shown in FIG. 1, the base 11 is a part fixed (member attached) to e.g. a ceiling surface 102 as a lower surface of a ceiling 101 as an installation space. The fixing method is not particularly limited, but e.g. a fixing method using a plurality of bolts or the like may be employed.

In the embodiment, a plate-like flange 111 provided in the lower part of the base 11 is attached to the ceiling surface 102, however, the attachment location of the base 11 to the ceiling surface 102 is not limited to that. For example, the location may be an upper surface of the base 11.

Further, the base 11 may include a joint 171, which will be described later, or not (see FIG. 2).

As shown in FIG. 1, the robot arm 5 is rotatably supported with respect to the base 11 and the arms 12 to 17 are respectively supported to be independently displaceable with respect to the base 11.

The first arm 12 has a bending shape. The first arm 12 has a first portion 121 connected to the base 11 and extending downward in the vertical direction from the base 11, a second portion 122 extending in the horizontal direction from the lower end of the first portion 121, a third portion 123 provided on an opposite end of the second portion 122 to the first portion 121 and extending in the vertical direction, and a fourth portion 124 extending in the horizontal direction from the distal end of the third portion 123. These first portion 121, second portion 122, third portion 123, and fourth portion 124 are integrally formed. Further, the second portion 122 and the third portion 123 are nearly orthogonal (crossing) as seen from the near side of the paper surface of FIG. 1 (in a front view orthogonal to both a first rotation axis O1 and a second rotation axis O2, which will be described later).

The second arm 13 has a longitudinal shape and is connected to the distal end of the first arm 12 (the opposite end of the fourth portion 124 to the third portion 123).

The third arm 14 has a longitudinal shape and is connected to the opposite end of the second arm 13 to the end to which the first arm 12 is connected.

The fourth arm 15 is connected to the opposite end of the third arm 14 to the end to which the second arm 13 is connected. The fourth arm 15 has a pair of supporting portions 151, 152 opposed to each other. The supporting portions 151, 152 are used for connection to the fifth arm 16.

The fifth arm 16 is located between the supporting portions 151, 152 and connected to the supporting portions 151, 152, and thereby, coupled to the fourth arm 15. Note that the structure of the fifth arm 16 is not limited to that. For example, only one supporting portion may be provided (cantilever).

The sixth arm 17 has a flat plate shape and is connected to the distal end of the fifth arm 16. Further, the hand 91 is detachably attached to the distal end of the sixth arm 17 (the opposite end to the fifth arm 16). The hand 91 includes, but not particularly limited to, e.g. a configuration having a plurality of finger portions (fingers).

Each of the exteriors of the above described respective arms 12 to 17 may be formed by a single member or a plurality of members.

Next, referring to FIGS. 1 and 2, the drive sources 401 to 406 with driving of these arms 12 to 17 will be explained. FIG. 2 shows the schematic view of the robot 1 as seen from the right side in FIG. 1. Further, FIG. 2 shows a state in which the arms 13 to 17 have been rotated from the state shown in FIG. 1.

As shown in FIG. 2, the base 11 and the first arm 12 are coupled via the joint 171. The joint 171 has a mechanism that rotatably supports the first arm 12 coupled to the base 11 with respect to the base 11. Thereby, the first arm 12 is rotatable around the first rotation axis (an nth rotation axis) O1 in parallel to the vertical direction (about the first rotation axis O1) with respect to the base 11. The first rotation axis O1 is aligned with a normal of the ceiling surface 102 to which the base 11 is attached. Further, the first rotation axis O1 is a rotation axis on the most upstream side of the robot 1. The rotation about the first rotation axis O1 is performed by driving of the first drive source 401 having a motor 401M. Further, the first drive source 401 is driven by the motor 401M and a cable (not shown in FIGS. 1 and 2), and the motor 401M is controlled by a robot control apparatus via a motor driver 301 electrically connected thereto. Note that the first drive source 401 may be adapted to transmit the drive power from the motor 401M by a reducer (not shown) provided with the motor 401M, or the reducer may be omitted.

The first arm 12 and the second arm 13 are coupled via a joint 172. The joint 172 has a mechanism that rotatably supports one of the first arm 12 and the second arm 13 coupled to each other with respect to the other. Thereby, the second arm 13 is rotatable around the second rotation axis (the (n+1) rotation axis) O2 in parallel to the horizontal direction (about the second rotation axis O2) with respect to the first arm 12. The second rotation axis O2 is orthogonal to the first rotation axis O1. The rotation about the second rotation axis O2 is performed by driving of the second drive source 402 having a motor 402M. Further, the second drive source 402 is driven by the motor 402M and a cable (not shown in FIGS. 1 and 2), and the motor 402M is controlled by the robot control apparatus via a motor driver 302 electrically connected thereto. Note that the second drive source 402 may be adapted to transmit the drive power from the motor 402M by a reducer (not shown) provided with the motor 402M, or the reducer may be omitted. The second rotation axis O2 may be parallel to the axis orthogonal to the first rotation axis O1, or the second rotation axis O2 may be different in axis direction from the first rotation axis O1, not orthogonal thereto.

The second arm 13 and the third arm 14 are coupled via a joint 173. The joint 173 has a mechanism that rotatably supports one of the second arm 13 and the third arm 14 coupled to each other with respect to the other. Thereby, the third arm 14 is rotatable around a third rotation axis O3 in parallel to the horizontal direction (about the third rotation axis O3) with respect to the second arm 13. The third rotation axis O3 is parallel to the second rotation axis O2. The rotation about the third rotation axis O3 is performed by driving of the third drive source 403. Further, the third drive source 403 is driven by a motor 403M and a cable (not shown in FIGS. 1 and 2), and the motor 403M is controlled by the robot control apparatus via a motor driver 303 electrically connected thereto. Note that the third drive source 403 may be adapted to transmit the drive power from the motor 403M by a reducer (not shown) provided with the motor 403M, or the reducer may be omitted.

The third arm 14 and the fourth arm 15 are coupled via a joint 174. The joint 174 has a mechanism that rotatably supports one of the third arm 14 and the fourth arm 15 coupled to each other with respect to the other. Thereby, the fourth arm 15 is rotatable around a fourth rotation axis O4 in parallel to the center axis direction of the third arm 14 (about the fourth rotation axis O4) with respect to the third arm 14. The fourth rotation axis O4 is orthogonal to the third rotation axis O3. The rotation about the fourth rotation axis O4 is performed by driving of the fourth drive source 404. Further, the fourth drive source 404 is driven by a motor 404M and a cable (not shown in FIGS. 1 and 2), and the motor 404M is controlled by the robot control apparatus via a motor driver 304 electrically connected thereto. Note that the fourth drive source 404 may be adapted to transmit the drive power from the motor 404M by a reducer (not shown) provided with the motor 404M, or the reducer may be omitted. The fourth rotation axis O4 may be parallel to the axis orthogonal to the third rotation axis O3, or the fourth rotation axis O4 may be different in axis direction from the third rotation axis O3, not orthogonal thereto.

The fourth arm 15 and the fifth arm 16 are coupled via a joint 175. The joint 175 has a mechanism that rotatably supports one of the fourth arm 15 and the fifth arm 16 coupled to each other with respect to the other. Thereby, the fifth arm 16 is rotatable around a fifth rotation axis O5 orthogonal to the center axis direction of the fourth arm 15 (about the fifth rotation axis O5) with respect to the fourth arm 15. The fifth rotation axis O5 is orthogonal to the fourth rotation axis O4. The rotation about the fifth rotation axis O5 is performed by driving of the fifth drive source 405. Further, the fifth drive source 405 is driven by a motor 405M and a cable (not shown in FIGS. 1 and 2), and the motor 405M is controlled by the robot control apparatus via a motor driver 305 electrically connected thereto. Note that the fifth drive source 405 may be adapted to transmit the drive power from the motor 405M by a reducer (not shown) provided with the motor 405M, or the reducer may be omitted. The fifth rotation axis O5 may be parallel to the axis orthogonal to the fourth rotation axis O4, or the fifth rotation axis O5 may be different in axis direction from the fourth rotation axis O4, not orthogonal thereto.

The fifth arm 16 and the sixth arm 17 are coupled via a joint 176. The joint 176 has a mechanism that rotatably supports one of the fifth arm 16 and the sixth arm 17 coupled to each other with respect to the other. Thereby, the sixth arm 17 is rotatable around the sixth rotation axis O6 (about the sixth rotation axis O6) with respect to the fifth arm 16. The sixth rotation axis O6 is orthogonal to the fifth rotation axis O5. The rotation about the sixth rotation axis O6 is performed by driving of the sixth drive source 406. Further, the sixth drive source 406 is driven by a motor 406M and a cable (not shown in FIGS. 1 and 2), and the motor 406M is controlled by the robot control apparatus via a motor driver 306 electrically connected thereto. Note that the sixth drive source 406 may be adapted to transmit the drive power from the motor 406M by a reducer (not shown) provided with the motor 406M, or the reducer may be omitted. The fifth rotation axis O5 may be parallel to the axis orthogonal to the fourth rotation axis O4, the sixth rotation axis O6 may be parallel to the axis orthogonal to the fifth rotation axis O5, or the sixth rotation axis O6 may be different in axis direction from the fifth rotation axis O5, not orthogonal thereto.

The robot 1 driving in the above described manner controls the actions of the arms 12 to 17 etc. while grasping a precision apparatus, a part, or the like with the hand 91 connected to the distal end of the sixth arm 17, and thereby, may perform respective work of carrying the precision apparatus, the part, or the like. The driving of the hand 91 is controlled by the robot control apparatus.

Further, a region (part) 103 of the third arm 14 and the fourth arm 15 surrounded by a dashed-two dotted line on the right in FIG. 1 is a region (part) in which the robot 1 does not interfere or hardly interferes with the robot 1 itself or another member. Accordingly, in the case where a predetermined member is mounted on the region 103, the member hardly interferes with the robot 1 or a peripheral apparatus or the like. Therefore, in the robot 1, the predetermined member can be mounted on the region 103. Particularly, in the case where the predetermined member is mounted on the region of the third arm 14 on the right in FIG. 1 of the region 103, the probability that the member interferes with a peripheral apparatus (not shown) provided on a workbench (not shown) is lower and the configuration is more effective.

Objects that can be mounted on the region 103 include e.g. a control apparatus for controlling driving of a sensor of a hand or a hand camera, a solenoid valve for a suction mechanism, etc.

As a specific example, for example, when a suction mechanism is provided in the hand, if a solenoid valve or the like is provided in the region 103, the solenoid valve does not cause an obstruction when the robot 1 is driven. Thus, the region 103 is highly convenient.

The motor drivers 301 to 306 are provided on the base 11 in the illustrated configuration, however, may be provided in the robot control apparatus, not limited to that.

As above, the configuration of the robot 1 is briefly explained.

Next, referring to FIGS. 3, 4, 5A to 5E, and 6, the relationships among the arms 12 to 17 will be explained, and the explanation will be made from various viewpoints with different expressions etc. Further, the third arm 14, the fourth arm 15, the fifth arm 16, and the sixth arm 17 are considered in a condition that they are stretched straight, in other words, in a condition that the fourth rotation axis O4 and the sixth rotation axis O6 are aligned or in parallel.

First, as shown in FIG. 3, a length L1 of the first arm 12 is set to be longer than a length L2 of the second arm 13.

Here, the length L1 of the first arm 12 is a distance between the second rotation axis O2 and a center line 611 extending in the leftward and rightward directions in FIG. 3 of a bearing part 61 (a member of the joint 171) that rotatably supports the first arm 12 as seen from the axis direction of the second rotation axis O2. Further, the length L2 of the second arm 13 is a distance between the second rotation axis O2 and the third rotation axis O3 as seen from the axis direction of the second rotation axis O2.

Further, as shown in FIG. 4, the robot 1 is adapted so that an angle θ formed between the first arm 12 and the second arm 13 may be 0° as seen from the axis direction of the second rotation axis O2. That is, the robot 1 is adapted so that the first arm 12 and the second arm 13 may overlap as seen from the axis direction of the second rotation axis O2. The second arm 13 is adapted so that, when the angle θ is 0°, i.e., the first arm 12 and the second arm 13 overlap as seen from the axis direction of the second rotation axis O2, the second arm 13 may not interfere with the second portion 122 of the first arm 12 and the ceiling surface 102.

Here, the angle θ formed by the first arm 12 and the second arm 13 is an angle formed by a straight line passing through the second rotation axis O2 and the third rotation shaft O3 (a center axis of the second arm 13 as seen from the axis direction of the second rotation axis O2) 621 and the first rotation axis O1 as seen from the axis direction of the second rotation axis O2 (see FIG. 3).

Furthermore, as shown in FIG. 4, the robot 1 is adapted so that the second arm 13 and the third arm 14 may overlap as seen from the axis direction of the second rotation axis O2. That is, the robot 1 is adapted so that the first arm 12, the second arm 13, and the third arm 14 may overlap at the same time as seen from the axis direction of the second rotation axis O2.

A total length L3 of the third arm 14, the fourth arm 15, the fifth arm 16, and the sixth arm 17 is set to be longer than the length L2 of the second arm 13. Thereby, as seen from the axis direction of the second rotation axis O2, when the second arm 13 and the third arm 14 are overlapped, the distal end of the robot arm 5, i.e., the distal end of the sixth arm 17 may be protruded from the second arm 13. Therefore, the hand 91 may be prevented from interfering with the first arm 12 and the second arm 13.

Here, the total length L3 of the third arm 14, the fourth arm 15, the fifth arm 16, and the sixth arm 17 is a distance between the third rotation axis O3 and the distal end of the sixth arm 17 as seen from the axis direction of the second rotation axis O2 (see FIG. 4). In this case, regarding the third arm 14, the fourth arm 15, the fifth arm 16, and the sixth arm 17, the fourth rotation axis O4 and the sixth rotation axis O6 are aligned or in parallel as shown in FIG. 4.

In the robot 1, as shown in FIGS. 5A, 5B, 5C, 5D, 5E, by rotation of the second arm 13 without rotation of the first arm 12, the distal end of the second arm 13 may be moved to a position different by 180° about the first rotation axis O1 through the state in which the angle θ is 0° as seen from the axis direction of the second rotation axis O2. Accordingly, the distal end of the robot arm 5 (the distal end of the sixth arm 17) may be moved from a position (first position) shown in FIG. 5A to a position (second position) shown in FIG. 5E different by 180° about the first rotation axis O1 from the position shown in FIG. 5A through the state in which the first arm 12 and the second arm 13 overlap as shown in FIG. 5C. Therefore, as shown in FIG. 6, the robot 1 performs an action of moving the hand 91 on a straight line as shown by an arrow 56 without actions of moving the hand 91 as shown by arrows 57, 58, and thereby, may move the distal end of the second arm 13 to the position different by 180° about the first rotation axis O1. Note that, in the movement, the third arm 14, the fourth arm 15, the fifth arm 16, and the sixth arm 17 are respectively rotated as appropriate.

The robot arm 5 may be driven as described above, and thereby, the space (installation region) for preventing the robot 1 from interfering may be made smaller. Accordingly, as shown in FIG. 6, the width (horizontal length) W of the installation region in which the robot 1 is installed may be made smaller than a width WX of related art. The width W is e.g. 80% of the width WX or less.

Further, when moving the hand 91 to the position different by 180° about the first rotation axis O1 as shown in FIGS. 5A to 5E, the robot 1 may move the hand 91 with little change of the height of the distal end of the robot arm 5 (at the nearly constant height). Accordingly, the height of the installation region of the robot 1 (the height in the vertical direction) may be made lower than the height of related art, specifically, e.g. 80% of the height of related art or less.

As described above, cables for power supply to the respective drive sources (motors) are connected. As shown in FIG. 7, these cables include a flat cable 18A having a strip shape held by a flat cable holding unit (hereinafter, simply referred to as "holding unit") 20A on the fifth rotation axis O5, and a flat cable 18B having a strip shape held by a flat cable holding unit (hereinafter, simply referred to as "holding unit") 20B on the sixth rotation axis O6. As below, the holding unit 20A and the holding unit 20B will be explained.

Around the holding unit 20A, e.g. a reducer 405RG of the fifth drive source 405, a pulley 66 coupled to the shaft portion of the motor 405M, a pulley 67 provided apart from the pulley 66 and coupled to the shaft portion of the reducer 405RG, and a belt 68 looped over the pulley 66 and the pulley 67 are provided. Further, around the holding unit 20B, e.g. a reducer 406RG of the sixth drive source 406 is provided.

As shown in FIGS. 8 to 11, the holding unit 20A has a core member 2A, a guide member (first guide portion) 3A, an external cylinder member 4A, a lid member (first lid member) 50A, and a lid member (second lid member) 60A.

The core member 2A has a first member 21 and a second member 22. The first member 21 and the second member 22 each has a whole shape of a nearly semicircular column. Further, a flat surface 211 of the first member 21 and a flat surface 221 of the second member 22 are combined to face each other and fastened with screws, and thereby, the core member 2A having a circular column shape as a whole may be formed. Further, in the combined state, the flat cable 18A may be sandwiched between the flat surface 211 and the flat surface 221 (see FIG. 9).

Note that one end side with respect to the sandwiched portion 183 sandwiched by the first member 21 and the second member 22 of the flat cable 18A is referred to as "input side 181" and the other side opposite thereto is referred to as "output side 182".

Further, the flat cable 18A is bent and turned in another direction from the sandwiched portion 183 toward the output side 182. Further, as shown in FIG. 11, the output side 182 is spirally wound around the outer circumference of the core member 2A.

As shown in FIGS. 8, 9, 11, the guide member 3A is sandwiched with the flat cable 18A by the core member 2A. The guide member 3A has a flat plate portion 31 having a flat plate shape sandwiched by the core member 2A and a curved portion 32 curved along the circumferential direction of the outer circumference of the core member 2A like the outer circumference. By the curved portion 32, the output side 182 of the flat cable 18A may be regulated to be wound along the outer circumference of the core member 2A, and thus, the winding state of the output side 182 stabilized.

The diameter of the core member 2A in the combined state of the first member 21 and the second member 22 is, depending on the thickness and the rigidity (the degree of bending) of the flat cable 18A, e.g. preferably 10 mm or more, more preferably from 10 mm to 80 mm, or even more preferably from 15 mm to 50 mm.

The whole length of the core member 2A is, depending on the width of the flat cable 18A, e.g. preferably from once to twice the width of the flat cable 18A, and more preferably from 1.2 to 1.5 times the width.

As shown in FIGS. 8 and 11, the core member 2A is placed inside the external cylinder member 4A. The external cylinder member 4A has a cylinder portion 41 having a circular cylinder shape and a plate portion 42 provided to cover one side of the cylinder portion 41 and having a plate shape. In the holding unit 20A, a housing portion 201 that houses the output side 182 of the flat cable 18A is defined between the core member 2A and the cylinder portion 41 and the plate portion 42. By the housing portion 201, the output side 182 of the flat cable 18A may be protected.

The cylinder portion 41 has a loss portion 411 having a partial loss in the circumferential direction, and a guide portion 412 extending from the loss portion 411 in the tangential direction of the cylinder portion 41. The output side 182 of the flat cable 18A projected from the housing portion 201 via the loss portion 411 to the outside is guided in the tangential direction by the guide portion 412. Thereby, the output side 182 may be easily routed toward its connection destination.

As shown in FIG. 10, the lid member 50A is a member that covers the cylinder portion 41 from the opposite side to the plate portion 42. By the lid member 50A, the flat cable 18A is protected and the output side 182 of the flat cable 18A may be prevented from protruding from the housing portion 201. Note that, in the embodiment, the lid member 50A is fastened to the first member 21 of the core member 2A with screws.

Further, the lid member 50A has a ring shape. In the lid member 50A, a loss portion having a reduced thickness on the front side is formed, and the loss portion functions as a guide portion 501 that bends the input side 181 of the flat cable 18A before sandwiched by the core member 2A and guides toward the core member 2A. Thereby, the input side 181 may be easily routed from its connection destination toward the core member 2A. Note that, in the lid member 50A, the guide portion 501 may be omitted.

The lid member 60A is a member that covers the output side 182 of the flat cable 18A guided by the guide portion 412 of the external cylinder member 4A. Thereby, the output side 182 may be prevented from protruding from the guide portion 412.

The lid member 60A is formed by two members of a block member 601 having a block shape and a plate member 602 having a plate shape in the embodiment, however, may be formed by a single member, not limited to that.

The block member 601 is fastened to the fifth arm 16 with the plate portion 42 of the external cylinder member 4A with screws. Further, the plate member 602 is fastened to the block member 601 with screws.

In the holding unit 20A having the above described configuration, the core member 2A is coaxially provided with the fifth rotation axis O5 and fastened to the fourth arm 15 with screws, and the external cylinder member 4A is fastened to the fifth arm 16 with screws. Further, the holding unit 20A holds the flat cable 18A in the fastening state as described above. Regarding the flat cable 18A, the input side 181 is fixed with respect to the fourth arm 15 like the core member 2A and the output side 182 is fixed with respect to the fifth arm 16 like the external cylinder member 4A.

When the fifth arm 16 rotates about the fifth rotation axis O5 during operation of the robot 1, the flat cable 18A is pulled and twisted and mechanically loaded, and the winding state around the core member 2A is almost rewound. However, rewinding of the winding state may be prevented by the sandwiching by the core member 2A. Thereby, the winding state is maintained, and thus, the mechanical load on the flat cable 18A may be relaxed, in other words, suppressed.

Note that, regarding the holding unit 20A, not limited to the configuration in which the core member 2A is fixed to the fourth arm 15 and the external cylinder member 4A is fixed to the fifth arm 16, but a configuration in which the core member 2A is fixed to the fifth arm 16 and the external cylinder member 4A is fixed to the fourth arm 15 may be employed.

Further, it is preferable that, in the holding unit 20A, a portion in contact with the flat cable 18A wound around the core member 2A is formed using a softer material than that of the flat cable 18A. Thereby, the flat cable 18A may be protected.

Constituent materials for the core member 2A, the guide member 3A, the external cylinder member 4A, the lid member 50A, and the lid member 60A are not particularly limited. For example, various metal materials including aluminum or stainless steel may be used.

Next, the holding unit 20B will be explained, and the explanation will be made with focus on differences from the above described holding unit 20A and the explanation of the same items will be omitted.

As shown in FIGS. 12 to 15, the holding unit 20B has a core member 2B, an external cylinder member 4B, a lid member 50B, and a guide reel 70B. In the holding unit 20B, the core member 2B is coaxially provided with the sixth rotation axis O6 and fastened to the sixth arm 17 with screws, and the external cylinder member 4B is fastened to the fifth arm 16 with screws.

As shown in FIG. 13, the core member 2B has a first member 23, a second member 24, and a third member 25.

The first member 23 has a "C" shape and the second member 24 having an arched shape is provided inside thereof. Further, a portion between the first member 23 and the second member 24 is a fixing portion (first fixing portion) 26 that sandwiches and fixes a flat cable 18B. When the sixth arm 17 rotates about the sixth rotation axis O6 during operation of the robot 1, rewinding of the winding state of the flat cable 18A around the core member 2B may be prevented by the fixing portion 26, and thus, the winding state may be maintained and contributes to suppression of the mechanical load on the flat cable 18A. Note that it is preferable that, in the fixing portion 26, a portion 231 of the first member 23 for sandwiching the flat cable 18B and a portion 241 of the second member 24 for sandwiching the flat cable 18B are respectively formed by flat surfaces.

The third member 25 has a circular column shape and is provided with the second member 24 inside of the first member 23.

As shown in FIG. 14, in an outer circumference portion of the core member 2B (first member 23), a groove 27 along the circumferential direction is formed. The groove 27 has a width (a length in the upward and downward directions in FIG. 14) sequentially increasing in a stepwise fashion from the sixth rotation axis O6 side, and has a minimum width portion having the minimum width and functioning as a guide portion 28, which will be described later, a maximum width portion 272 having the maximum width, and an intermediate width portion 271 having a width between the guide portion 28 and the maximum width portion 272. The intermediate width portion 271 functions as the housing portion 201 that houses the most part of the output side 182 of the flat cable 18B.

Further, as shown in FIG. 13, the guide portion (second guide portion) 28 that regulates the flat cable 18B in its width direction (the sixth rotation axis O6 direction) is located between the housing portion 201 and the fixing portion 26. As shown in FIG. 14, the guide portion 28 is defined between the first member 23 and the second member 24. A width $W_{28}$ in the width direction in which the flat cable 18B is regulated by the guide portion 28 is shorter than a length $W_{271}$ in the width direction in which the flat cable 18B is regulated by the housing portion 201 (intermediate width portion 271). Thereby, the regulation on the flat cable 18B may be gradually relaxed from the fixing portion 26 toward the housing portion 201, and thus, an excessive force on the flat cable 18B within the housing portion 201 may be prevented. Further, within the housing portion 201, wear of the flat cable 18B may be prevented as much as possible.

As shown in FIG. 13, the external cylinder member 4B has a cylinder shape, and has a first slit 43 formed from the inner circumference portion along its tangential direction and a second slit 44 communicating with the first slit 43 and formed along the circumferential direction of the external cylinder member 4B.

The second slit 44 functions as a fixing portion (second fixing portion) that sandwiches and fixes the input side 181 of the flat cable 18B in the middle toward the housing portion 201. By the fixation, even when the input side 181 is pulled, the input side 181 may be prevented from being drawn from the holding unit 20B.

The first slit 43 located between the second slit 44 and the housing portion 201 functions as a guide portion (third guide portion) that restricts the width direction of the flat cable 18B. As shown in FIG. 14, a length $W_{43}$ in the width direction in which the flat cable 18B is regulated by the first slit 43 is shorter than the length $W_{271}$ in the width direction in which the flat cable 18B is regulated by the housing portion 201 (intermediate width portion 271). Thereby, the regulation on the flat cable 18B may be gradually relaxed from the second slit 44 as the fixing portion toward the housing portion 201, and thus, an excessive force on the flat cable 18B within the housing portion 201 may be prevented.

As shown in FIGS. 13 and 14, the guide reel 70B is provided in the housing portion 201. As shown in FIG. 15, the guide reel 70B has a plurality of (eight in the illustrated configuration) guide rollers 7 and a supporting member 8 that collectively and rotatably supports the guide rollers 7. Note that the number of provided guide rollers 7 is eight in the embodiment, however, not limited to that. For example, the number may be one to seven, nine, or more.

The supporting member 8 has an annular shape, and has a first ring 81 and a second ring 82 coaxially provided with the core member 2B and a plurality of (eight in the illustrated configuration) shaft portions 83 projected from the first ring 81 to the second ring 82. The respective shaft portions 83 are provided at equal intervals along the circumferential direction of the first ring 81, and connected and fixed to the second ring 82 on the opposite side to the first ring 81. The respective shaft portions 83 are inserted into the guide rollers 7. Thereby, the respective guide rollers 7 may rotate about the shaft portions 83. Further, the supporting member 8 itself is rotatable about the sixth rotation axis O6 independently of the respective guide rollers 7.

The respective guide rollers 7 are in contact with the flat cable 18B. Further, the flat cable 18B is folded in "U" shape by one guide roller 7 of these guide rollers 7. When the sixth arm 17 rotates about the sixth rotation axis O6 during the operation of the robot 1, a folded portion 184 folded in the "U" shape of the flat cable 18B may smoothly move integrally with the guide reel 70B within the housing portion 201. Thereby, mechanical load on the flat cable 18B may be suppressed.

As shown in FIG. 14, of the spaces formed by the housing portion 201, a space 202 inner than the rotation shaft (shaft portions 83) of the guide rollers 7 is formed symmetrically with respect to a center line $O_{202}$ in its width direction (upward and downward directions in FIG. 14). Thereby, even when the flat cable 18B moves within the space 202, the cable may be in contact with the side surface portions of the guide rollers 7 and the intermediate width portion 271 nearly equally, and thereby, local wear in the flat cable 18B may be prevented.

Note that the configuration of the supporting member 8 is not limited to the configuration shown in FIG. 15, but may be e.g. the following configurations.

(1) A configuration in which the respective eight shaft portions 83 project to the first ring 81 and the second ring 82.

(2) A configuration in which the four shaft portions 83 project to the first ring 81, the four shaft portions 83 project to the second ring 82, and the shaft portions 83 on the first ring 81 side and the shaft portions 83 on the second ring 82 are alternately placed along the circumferential direction of the supporting member 8.

(3) A configuration in which the second ring 82 is omitted and, instead, a cap attached to the respective shaft portions 83 of the first ring 81 and pressing the guide rollers 7 are provided.

As shown in FIG. 12, the lid member 50B is a disc-shaped member that covers the external cylinder member 4B from one side. On the rear surface side of the lid member 50B, i.e., on the flat cable 18B side, a convex portion 503 that prevents the flat cable 18B from protruding from the housing portion 201 is projected. The convex portion 503 has a ring shape along the circumferential direction of the third member 25 of the core member 2B. The lid member 50B is fastened to the third member 25 of the core member 2B in the embodiment.

Further, in the lid member 50B, an insertion hole 502 through which the output side 182 of the flat cable 18B is inserted is formed.

Constituent materials for the core member 2B, the external cylinder member 4B, the lid member 50B, and the guide reel 70B are not particularly limited. For example, various metal materials including aluminum or stainless steel may be used.

As above, the holding unit 20A and the holding unit 20B are described.

Note that the holding unit 20A is provided on the fifth rotation axis O5 and used as described above, however, not limited to that. For example, the unit may be provided on any rotation axis of the first rotation axis O1, the second rotation axis O2, the third rotation axis O3, the fourth rotation axis O4, and the sixth rotation axis O6 and used.

Similarly, the holding unit 20B is provided on the sixth rotation axis O6 and used as described above, however, not limited to that. For example, the unit may be provided on any rotation axis of the first rotation axis O1, the second rotation axis O2, the third rotation axis O3, the fourth rotation axis O4, and the fifth rotation axis O5 and used.

As above, the robot according to the invention is explained according to the illustrated embodiments, however, the invention is not limited to those and the respective parts forming the robot may be replaced by arbitrary configurations that may fulfill the same functions. Further, arbitrary configurations may be added.

In the above described embodiments, the number of rotation axes of the robot arm of the robot is six, however, the invention is not limited to that. The number of rotation axes of the robot arm may be e.g. two, three, four, five, or seven or more.

Further, in the above described embodiments, the number of robot arms of the robot is one, however, the invention is not limited to that. The number of robot arms of the robot may be e.g. two or more. That is, the robot may be e.g. a multi-arm robot including a dual-arm robot. Furthermore, in the invention, the robot (robot main body) may be a robot of another type. Specific examples include e.g. a legged walking (mobile) robot having leg parts.

Furthermore, in the above described embodiments, regarding conditions (relationships) of an nth rotation axis, an nth arm, an (n+1) th rotation axis, and an (n+1) th arm defined in the appended claims, the case where n is one, i.e., the case where the first rotation axis, the first arm, the second rotation axis, and the second arm satisfy the conditions is explained, however, the invention is not limited to that. The n may be an integer of one or more, and the same conditions as those in the case where n is one may be satisfied with respect to an arbitrary integer equal to or more than one. Therefore, for example, the case where n is two, i.e., the case where the second rotation axis, the second arm, the third rotation axis, and the third arm may satisfy the same conditions as those in the case where n is one, the case where n is three, i.e., the case where the third rotation axis, the third arm, the fourth rotation axis, and the fourth arm may satisfy the same conditions as those in the case where n is one, the case where n is four, i.e., the case where the fourth rotation axis, the fourth arm, the fifth rotation axis, and the fifth arm may satisfy the same conditions as those in the case where n is one, or, the case where n is five, i.e., the case where the fifth rotation axis, the fifth arm, the sixth rotation axis, and the sixth arm may satisfy the same conditions as those in the case where n is one.

In addition, in the above described embodiments, the length of the nth arm is made longer than the length of the (n+1)th arm, and thereby, the nth arm and the (n+1)th arm can overlap as seen from the axis direction of the (n+1)th rotation axis. However, a configuration in which the length of the nth arm is shorter than the length of the (n+1)th arm or a configuration in which the length of the nth arm is equal to the length of the (n+1)th arm may be employed if the nth arm and the (n+1)th arm can overlap as seen from the axis direction of the (n+1)th rotation axis.

The entire disclosure of Japanese Patent Application No. 2015-090067, filed Apr. 27, 2015 is expressly incorporated by reference herein.

What is claimed is:

1. A robot comprising:
    a cylindrical housing;
    a core member having a first member and a second member disposed within the cylindrical housing, the core member having an outer circumferential surface;
    an external cylinder member that places the core member inside;
    a flat cable sandwiched by the first member and the second member and wound around the outer circumferential surface of the core member;
    a housing portion located between the core member and the external cylinder member and housing the flat cable;
    a first fixing portion that fixes the flat cable to the core member; and
    a second guide portion located between the housing portion and the first fixing portion and regulating a width direction of the flat cable,
    wherein a length in the width direction regulated by the second guide portion is shorter than a length in the width direction regulated by the housing portion.

2. The robot according to claim 1, further comprising:
    a first arm; and
    a second arm rotatably provided on the first arm,
    wherein the flat cable is fixed to the first arm and the second arm.

3. The robot according to claim 2, wherein the core member is placed at a center of rotation of the second arm.

4. The robot according to claim 1, further comprising a first guide portion provided in the core member and regulating the flat cable wound around the outer circumferential surface of the core member.

5. The robot according to claim 1, further comprising:
    a second fixing portion that fixes the flat cable to the external cylinder member; and
    a third guide portion located between the housing portion and the second fixing portion and regulating the width direction of the flat cable,
    wherein a length in the width direction regulated by the third guide portion is shorter than the length in the width direction regulated by the housing portion.

6. The robot according to claim 1, further comprising a guide roller provided in the housing portion, being in contact with the flat cable, and being rotatable,
    wherein, of spaces formed by the housing portion, a space inner than a rotation shaft of the guide roller is symmetric in the width direction.

7. The robot according to claim 6, further comprising:
    a plurality of the guide rollers; and
    a supporting member that rotatably supports the plurality of guide rollers.

8. The robot according to claim 7, wherein the respective guide rollers and the supporting member are rotatable independently of each other.

9. The robot according to claim 7, wherein the flat cable is folded by one guide roller of the plurality of guide rollers.

10. The robot according to claim 1, further comprising:
    a first arm provided rotatably about a first rotation axis; and
    a second arm provided rotatably about a second rotation axis in an axis direction different from an axis direction of the first rotation axis,
    wherein a length of the first arm is longer than a length of the second arm, and the first arm and the second arm overlap as seen from the axis direction of the second rotation axis.

* * * * *